United States Patent [19]

Hanamura

[11] Patent Number: 5,095,247
[45] Date of Patent: Mar. 10, 1992

[54] PLASMA DISCHARGE APPARATUS WITH TEMPERATURE SENSING

[75] Inventor: Shigeki Hanamura, Ithaca, N.Y.
[73] Assignee: Shimadzu Corporation, Kyoto, Japan
[21] Appl. No.: 400,905
[22] Filed: Aug. 30, 1989
[51] Int. Cl.⁵ ............................................... H01J 7/24
[52] U.S. Cl. .............................. 315/111.21; 315/115; 315/117; 313/231.31
[58] Field of Search ...................... 315/111.21, 111.51, 315/111.71, 111.81, 111.91, 115, 117, 106, 107; 313/231.31

[56] References Cited

U.S. PATENT DOCUMENTS

| | | | |
|---|---|---|---|
| 4,301,391 | 11/1981 | Seliger et al. | 315/111.21 X |
| 4,341,947 | 7/1982 | Komura et al. | 315/111.21 X |
| 4,479,075 | 10/1984 | Elliot | 315/111.21 |
| 4,684,848 | 8/1987 | Kaufman et al. | 315/111.21 X |
| 4,740,730 | 4/1988 | Uda et al. | 315/111.21 X |
| 4,877,999 | 10/1989 | Knapp et al. | 315/111.21 X |

*Primary Examiner*—Eugene R. Laroche
*Assistant Examiner*—Do Hyum Yoo
*Attorney, Agent, or Firm*—Armstrong, Nikaido, Marmelstein, Kubovcik & Murray

[57] ABSTRACT

A plasma discharge apparatus has a first electrode, a counter electrode, and a power source for supplying power to the first and counter electrodes for initiating and sustaining plasma discharge therebetween. An isolated heater is provided for heating only the first electrode. An isolated temperature sensor is provided for sensing the temperature of the first electrode, and a temperature controller is provided, responsive to the output of the temperature sensor, for controlling the heater to control the temperature of the first electrode.

15 Claims, 6 Drawing Sheets

PLASMA DISCHARGE APPARATUS WITH TEMPERATURE SENSING

BACKGROUND OF THE INVENTION

The instant invention is related to an atmospheric pressure discharge system for generating a plasma discharge for exciting samples to be analyzed by optical emission spectrometry.

Previously, such plasma discharge systems have included microwave-induced plasma and inductively coupled plasma. However, these systems have drawbacks, set forth below, which the instant invention overcomes.

In detecting elements in air, water or solid samples, for example, for use in environmental research or other types of research, such microwave-induced plasma (MIP) systems have been well known for producing a plasma discharge to excite samples to be analyzed by known optical emission spectrometry systems. Such MIP systems have also been known as single electrode plasma torch systems. In using an MIP system, elements may be detected, however, such systems require a magnetron tube operating at a frequency of 2,450 MHz for example.

The MIP system can use helium as a carrier gas and thus can detect non-metals. However, the employment of the magnetron tube also requires a high voltage of from 1000 V to 2000 V to operate the magnatron tube. Additionally, it should be noted that the MIP system requires a high flow rate for the gas flowing through it. A flow rate of 3 to 4 liters/min. is required to properly cool the electrodes. A sufficient exhaust velocity of gas from the plasma chamber is necessary in order to prevent leakage of surrounding air into the plasma chamber, thus causing inaccuracies in the detection of the emission spectra.

Another system for generating a plasma discharge is the inductively coupled plasma (ICP). The ICP system uses only Argon for a carrier gas and thus cannot be used for detecting non-metals, because a helium discharge is essential for detecting non-metals. The ICP system has a relatively large gas consumption and requires extremely large equipment for operation.

The above systems, single electrode plasma torch (MIP) and ICP, of providing a plasma discharge for optical emission spectrometry require large amounts of equipment for performing the necessary analysis. Such large equipment demands makes the use of the above systems incompatible with taking field measurements in environmental research or the like.

SUMMARY OF THE INVENTION

Accordingly, a new excitation source for generating a plasma discharge for optical emission spectrometry has been developed which overcomes the drawbacks of the above described systems. The excitation source of the instant invention can be used to detect non-metal elements in a simple and relatively small apparatus, and thus allow the identification of organic compounds from the elemental detection technique. In the instant invention, trace levels of non-metal elements such as oxygen, hydrogen, carbon, nitrogen, chlorine and fluorine, as well as other elements, can be accurately detected.

The instant invention includes a heating means to heat one of the electrodes in the plasma discharge tube. By heating the electrode in the plasma discharge tube, the electron density in the discharge gap is increased. This likewise increases the sensitivity of the apparatus of the instant invention. Because the electrode of the discharge tube is maintained at a high temperature, the discharge tube can also operate with a relatively low supply voltage. A further advantage is that the supply of gas to the plasma chamber occurs under atmospheric pressure. Therefore, the equipment employing the instant invention becomes simple, small, and light, and thus is easily adapted to field use.

The heated electrode emits electrons as a function of the temperature of the electrode and of the electrode material. The most common and preferred electrode material for such an electrode is platinum, although other materials may be used. Platinum is preferred because it is a chemically stable material.

For analytical purposes, it is important for the electrode to have a constant temperature. Thus, the invention also includes a controller for controlling the electrode temperature. By controlling the temperature of the electrode to remain constant, the excitation energy remains constant and thus the ratio of the emission spectra intensity and concentration of each element to be analyzed remain constant. Accordingly, the accuracy of measurements can be improved.

The instant invention is therefore directed to a plasma discharge apparatus having a first electrode, a counter electrode, and a power source for supplying power to the first and counter electrodes for initiating and sustaining plasma discharge therebetween. An isolated is provided for heating only the first electrode. An isolated temperature sensor is provided for sensing the temperature of only the first electrode, and a temperature controller is provided, responsive to the output of the temperature sensor, for controlling the heating means to control the temperature of the first electrode.

DETAILED DESCRIPTION OF THE PREFERRED EMBODIMENT

Figure 1:
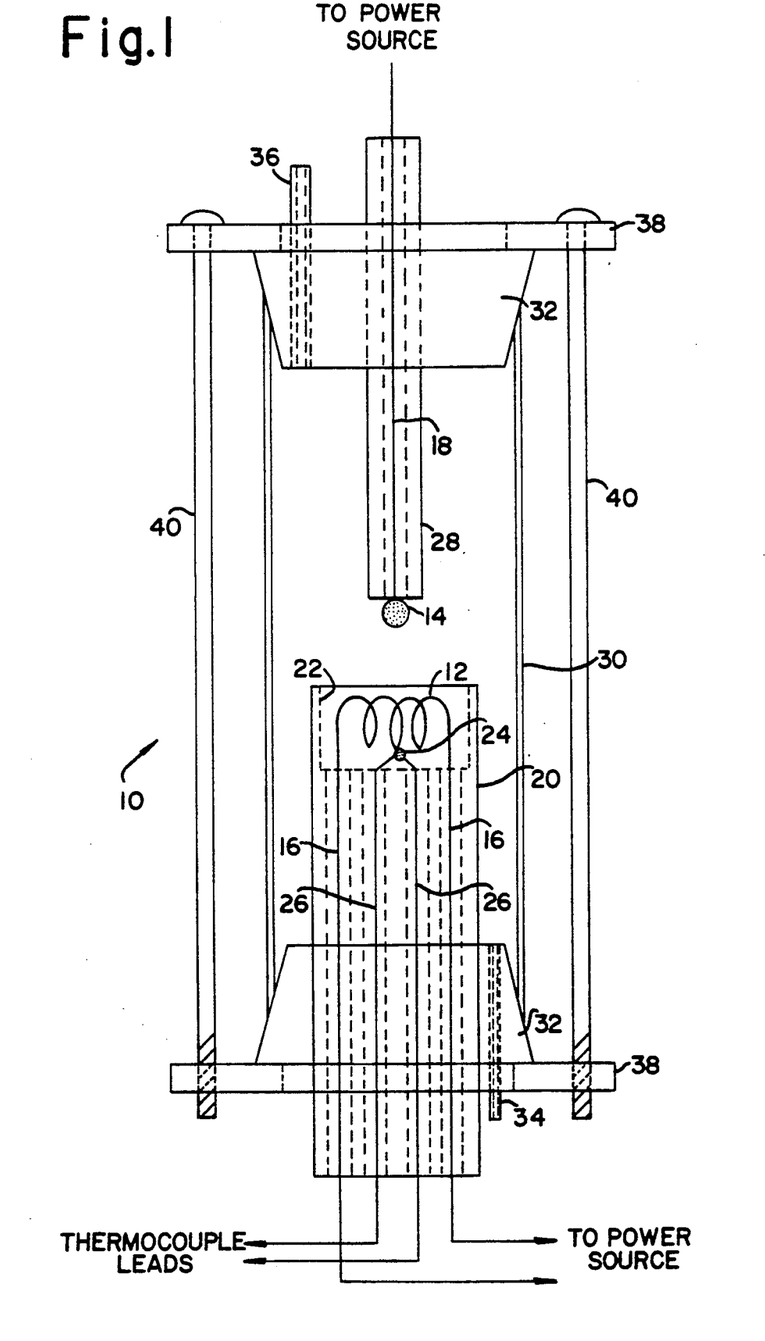
FIG. 1 is a cross-sectional view of a plasma discharge tube in accordance with the instant invention.
Figure 4:
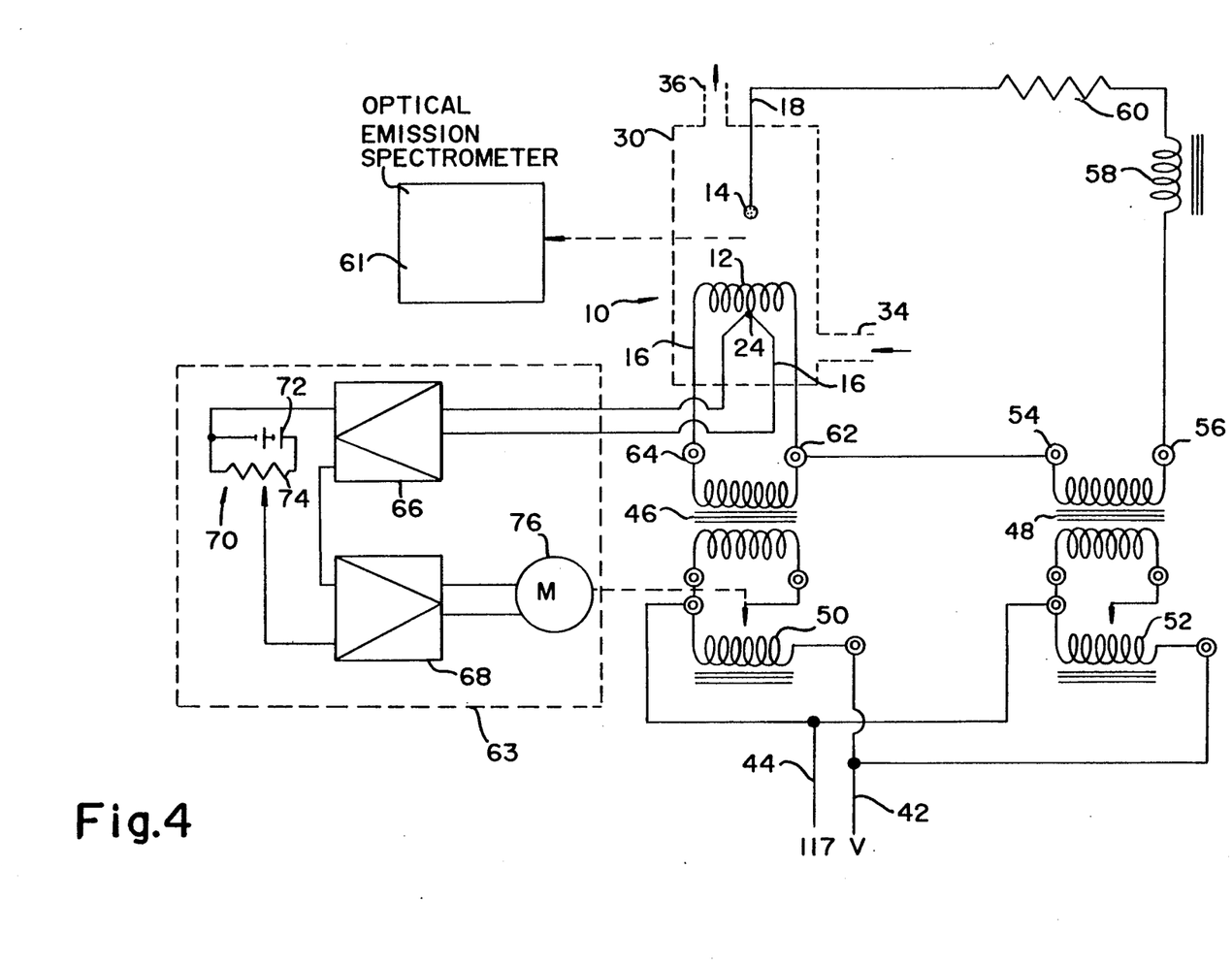
FIG. 4 is a schematic diagram of the atmospheric pressure discharge system including the plasma discharge tube of FIG. 1.

The plasma discharge tube of this invention is illustrated in cross-sectional form in FIG. 1. The plasma discharge tube is comprised of a heated electrode 12 and a spherical counter electrode 14. Each electrode is connected by leads to the power source, as illustrated in FIG. 4, and as will be discussed below. Heated electrode 12 is preferably a platinum filament electrode having leads 16 extending through and supported by tubing 20. The tubing 20 is an insulating tubing and preferably formed of alumina tubing or other similar type of tubing. A recess 22 is formed in the upper portion of tubing 20 in order to accommodate the heated electrode 12 therein. A thermocouple 24 (for example, a platinum-platinum/rhodium thermocouple) is attached directly to the filament of the heated electrode 12. The leads 26 of the thermocouple 24 also extend through the tubing 20 and are connected to a temperature controlling circuit 64 (described below). The counter electrode 14 is preferably a platinum spherical electrode (for example 3 mm in diameter) which is supported by tube 28 (preferably an alumina tubing or the like) having lead 18 extending therethrough and connecting with a power source.

The filament of the heated electrode, as positioned in recess 22 might have a preferable outside diameter of 0.4 mm and a length of 3.5 mm. In order to accommodate the electrode, recess 22 might be provided with a depth of 5 mm and an inside diameter of 4.5 mm.

The electrodes are encased within a quartz envelope 30 having rubber stoppers or the like at each end thereof. An intake tube 34 is provided for admitting the sample gas and helium mixture into the interior of the plasma discharge tube 10. Exhaust tube 36 is provided for exhausting the sample gas and helium (or other type of carrier gas) from the plasma discharge tube 10. In the illustration in FIG. 1, end plates 38 are provided to support the rubber stoppers 32 and electrodes therebetween. Mounting bolts 40 are provided to secure end plates 38 to be fixed with respect to one another.

Figure 2:
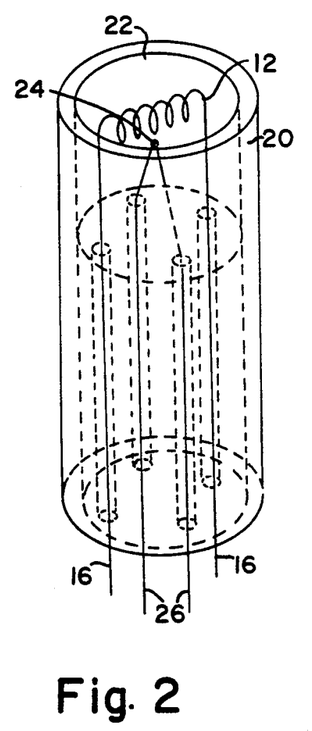
FIG. 2 is a perspective view of the heated electrode of FIG. 1.

FIG. 2 is a perspective view of the heated electrode 12 positioned inside of the recess 22 of tubing 20. As can also be seen in FIG. 2, the thermocouple 24 is attached directly to the filament of heated electrode 12. Leads 16 and 26 extend through the tubing 20.

Figure 3:
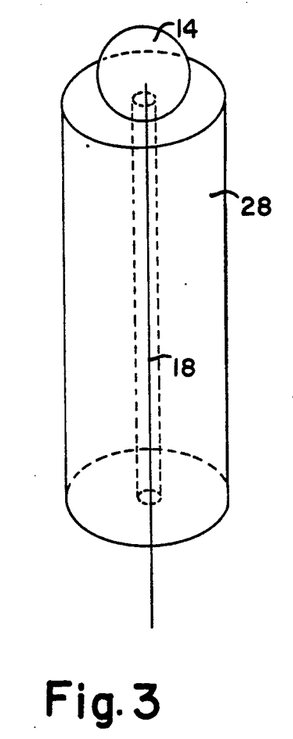
FIG. 3 is a perspective view of the counter electrode of FIG. 1.

Accordingly, FIG. 3 is a perspective view of the spherical counter electrode 14 supported by tubing 28. While a spherical electrode is the preferable form of electrode to be used in this application, other shapes of electrodes may be used. Lead 18 extends from counter electrode 14 through tubing 28 to the power source described in detail below.

FIG. 4 discloses the plasma discharge tube connected in a discharge system including a power supply. The plasma discharge tube 10 is illustrated with heated electrode 12 and counter electrode 14 inside of the quartz envelope 30 (or quartz window). Thermocouple 24 is attached to the heated electrode 12, and an intake tube 34 is provided into the quartz envelope 30, while an exhaust tube 36 exhausts the sample gas and helium mixture from the quartz envelope 30.

Power for this system may be provided from a standard 117 volt AC (60 Hz) system. Of course, power from systems with different voltage and frequency may also be used. The 117 volt AC power is supplied to input leads 42 and 44 which are each attached to an opposite side of variable transformers 50 and 52. Step-up transformer 48, the primary coil of which is connected to variable transformer 52, provides supply voltage to the electrodes to initiate and sustain the plasma discharge therebetween. For example, in FIG. 4, step-up transformer 48 has terminals 54 and 56 on the outputs of the secondary winding. A voltage of 117 volts is provided to the primary winding, and for example, a voltage of a maximum of 600 volts is output from the secondary winding, with a current of about 50 mA. Of course, other voltages may be provided as necessitated by the specific requirements of the plasma discharge tube used.

The output from terminal 56 of step-up transformer 48 is connected to a choke coil 58 and thereafter to a resistor 60. The choke coil 58 may typically have a value of 3 Henry, while resistor 60 may typically have a value of 2 KΩ. Resistor 60 is then connected to lead 18 of counter electrode 14. The other side of the secondary winding of step-up transformer 48 is connected from terminal 54 to terminal 62 of the secondary winding of step-down transformer 46. Terminals 62 and 64 of step-down transformer 46 are connected to leads 16 of heated electrode 12. The primary coil of step-down transformer has an input of 117 volts, the secondary coil has an output of substantially 3-6 volts, with a maximum current of 10 amperes. Of course, as with step-up transformer 48, the output values of step-down transformer 46 may be adjusted to meet the particular requirements of the plasma discharge tube used.

Step-up transformer 48 is therefore provided to initiate and sustain the plasma discharge. Step-down transformer 46 is provided to heat the heated electrode 12 to the proper temperature for emitting electrons to increase the electron density needed to sustain the plasma discharge. Because the current from the step-up transformer 48 also flows through heated electrode 12, affecting the temperature thereof, it is necessary to provide some means in which to keep the temperature of the heated electrode 12 at a constant level. It should be noted that the temperature of the heated electrode can also be affected by the amount of gas flowing past it. Accordingly, thermocouple 24 is attached directly to the filament of heated electrode 12, and the leads of thermocouple 24 are further connected to a temperature controlling means which in turn controls the variable transformer 50 in order to control step-down transformer 46 and thus regulate the current to heated electrode 12, and therefore to control the temperature thereof.

In FIG. 4, the temperature controlling circuit is generally indicated within the dotted line 63. The two leads of thermocouple 24 are connected to the inputs of amplifier 66. One output of amplifier 66 is input directly to power amplifier 68. A temperature setting circuit 70 includes a power source 72 and a potentiometer 74 connected in parallel. The tap of the potentiometer 74 is connected to an input of power amplifier 68. The outputs of power amplifier 68 control motor 76, which in turn controls the tap of variable transformer 50 to control the amount of current flowing through, and therefore the temperature of, heated electrode 12. Temperature controlling circuit 63 is only one possible method of controlling the temperature of the heated electrode 12. It is contemplated that a microcomputer or other electronic circuits may be used to control the temperature of the heated electrode 12.

Figure 5:
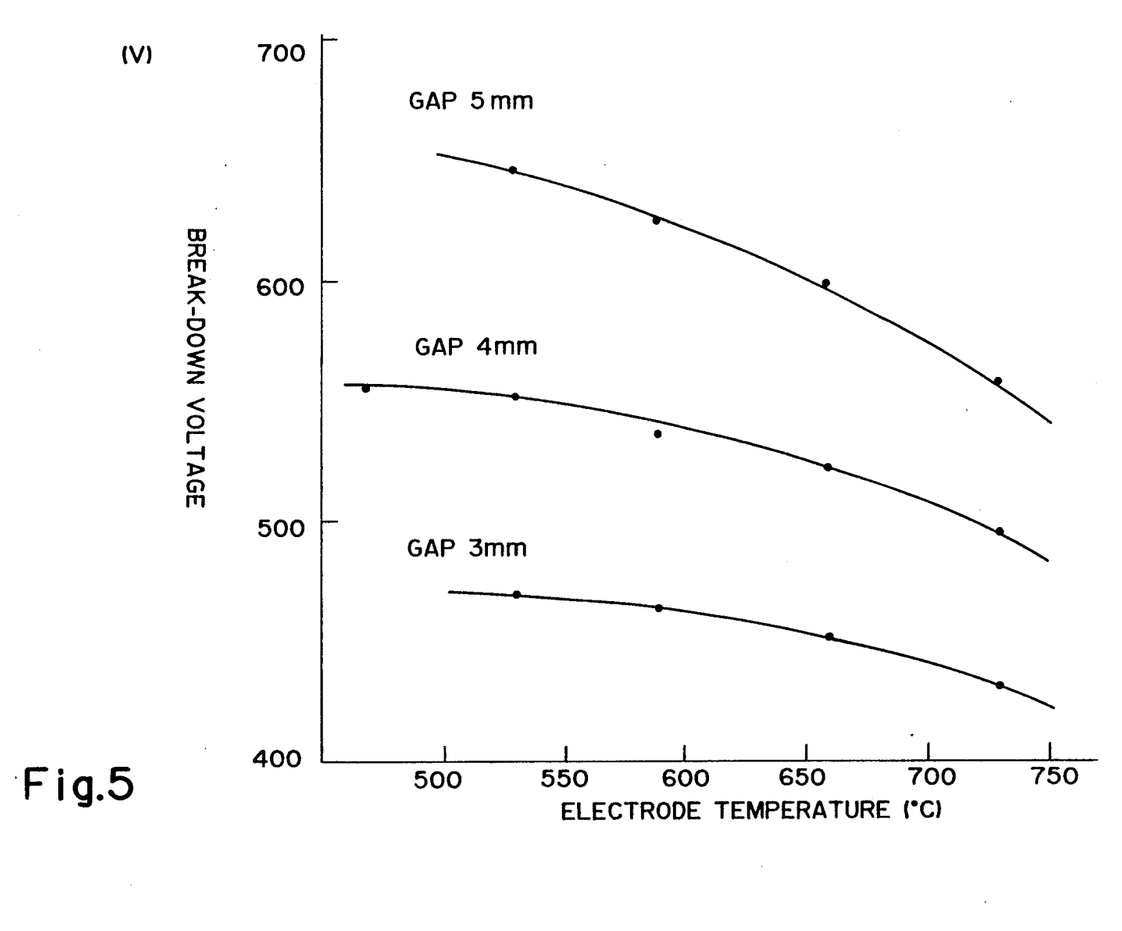
FIG. 5 is a graph illustrating the effect of electrode temperature upon the break-down voltage of the plasma discharge.

FIG. 5 is a graph illustrating the effect of electrode temperature upon the break-down voltage of the plasma discharge. Of course, the break-down voltage is the voltage required to initiate the plasma discharge itself. The graph of FIG. 5 illustrates the break-down required for gaps between the heated electrode 12 and the counter electrode 14 of 3, 4 and 5 mm. As clearly seen, in each case, as the electrode temperature increases, the break-down voltage decreases. Thus, if temperature is allowed to fluctuate, the breakdown voltage will also fluctuate. This changes the electron density which is important for excitation and providing a constant emission intensity.

Figure 6:
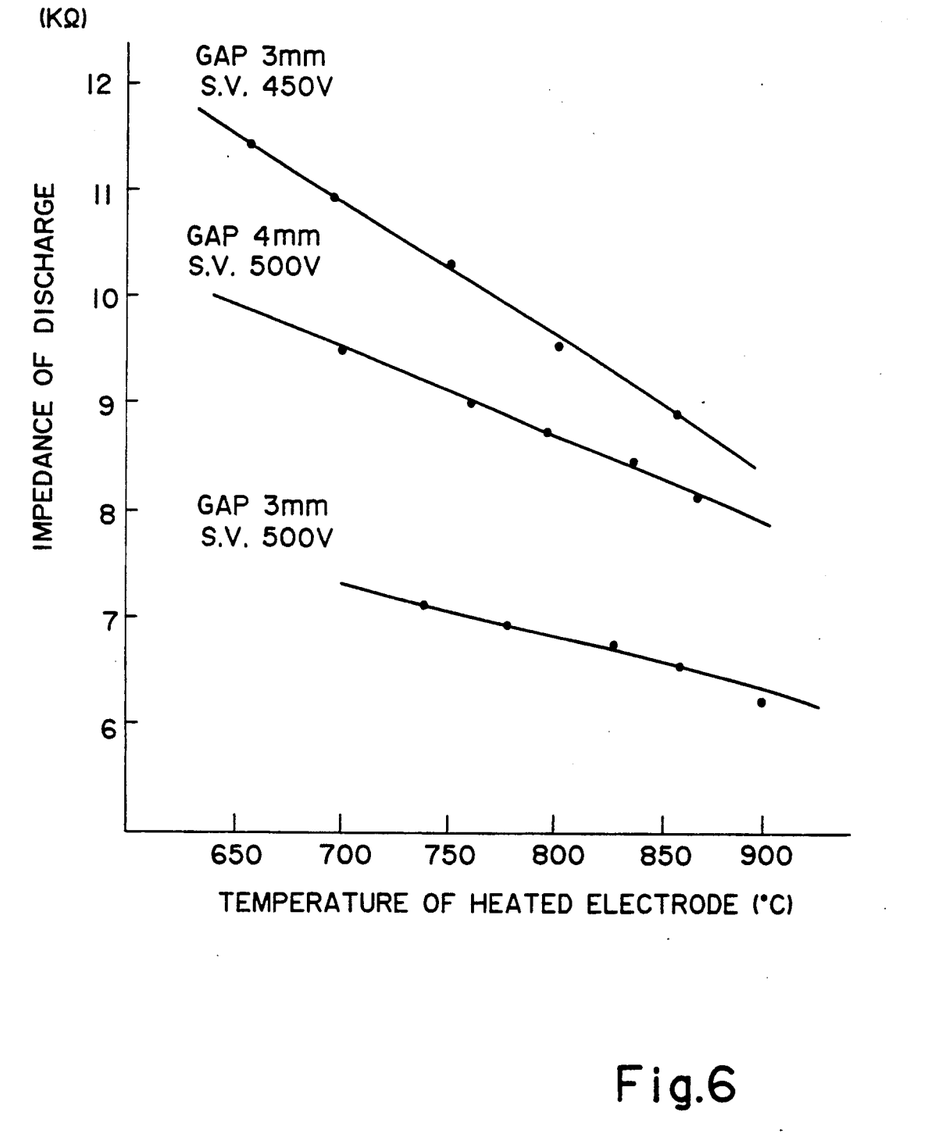
FIG. 6 is a graph illustrating the influence of heated electrode temperature upon the impedance of discharge.

FIG. 6 is a graph illustrating the influence of heated electrode temperature on the impedance of discharge. As set forth above, it is very important to maintain the proper temperature of the electrode for proper analysis of the sample. FIG. 6 illustrates how, as the temperature of the heated electrode 12 increases, the impedance of discharge decreases. Additionally, the lower impedance of discharge means the higher electron density of discharge and the higher electron density of plasma have more energy to excite the element to be analyzed. Thus, it is important to maintain the temperature of the heated electrode in order to promote a stable discharge to have reproducible results.

Figure 7:
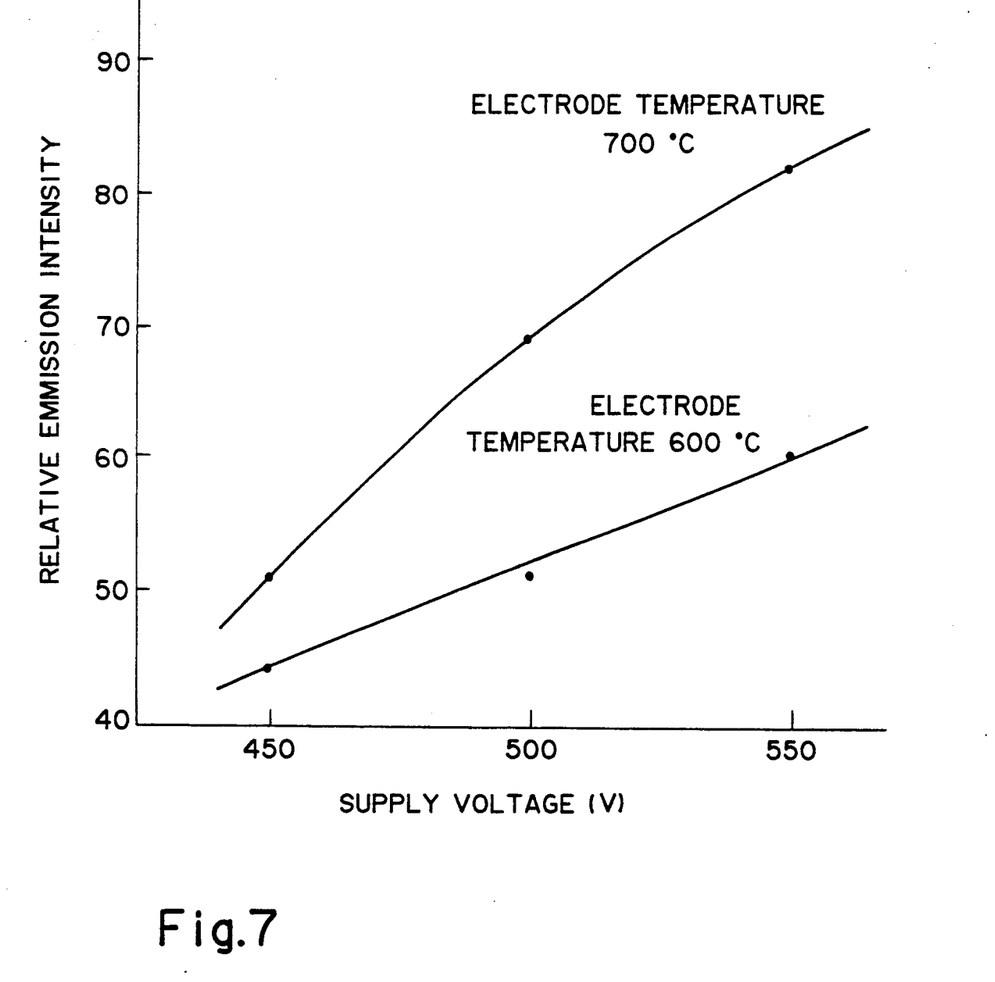
FIG. 7 is a graph illustrating the effect of supply voltage on the emission intensity of hydrogen.

FIG. 7 shows a graph illustrating the effect of supply voltage on the emission intensity of hydrogen, for example. For detecting hydrogen in a sample, it is important for the relative spectral emission intensity from the plasma discharge to be as large as possible, in order to promote accurate readings. FIG. 7 illustrates that as the supply voltage to the electrodes increases so does the relative spectral emission intensity. FIG. 7 also illustrates that as the electrode temperature of the heated electrode is increased, a significant increase in the relative spectral emission intensity can be found. Therefore, it is important to note that since the emission intensity is also a function of the electrode temperature, the electrode temperature must be maintained at a constant value in order to maintain the relative spectral emission intensity at a constant value, in order to insure accuracy of results.

In operation, a sample is mixed with helium, or other type of carrier gas and input to the quartz envelope 30 through intake tube 34. Such sampling techniques are well known, and may be used for taking solid samples, liquid samples, or gas samples, such as air. Solid samples are often heated and the elements to be analyzed are therefore vaporized and mixed with a carrier gas, such as helium. In a liquid sample, the water may be removed by freeze drying or other process, and then the resulting powder can be heated as the solid sample above. In analyzing a gas sample, such as air, the gas can simply be introduced into the quartz envelope 30. If required, known methods of pre-concentration can be used.

The sample gas with helium mixture may be input to intake tube 34 under atmospheric pressure. There is no requirement to have high pressure gas, or to have low pressure gas flowing through this system. Further, the flow rates of the gas itself may be determined by the sizes of intake tube 34 and exhaust tube 36. The instant invention only requires a flow rate of around 0.8 liters/min. It has been found that when the exiting gas has a velocity of about 5 m/sec. or greater there is no problem of leakage of the atmosphere back into the plasma chamber. Additionally, it should be noted that separate elements present in a solid sample (for example) can be separated off by changing the level of heating of the sample. Since different elements to be analyzed have different boiling points, different elements may be detected by heating the sample to the boiling point corresponding to the specific element. The apparatus of the instant invention can be used not only for element detection, but also for detecting the relative ratio of constituent elements.

Power is supplied to step-down transformer 46 in the form of 117 volts to the primary coil, and the voltage output from the secondary coil to the heated electrode 12 is generally from 3-6 volts, with a maximum current of about 10 amperes. The electric discharge in the atmospheric pressure helium carrier gas is created by a 60 Hz, 550-600 volt, 40-50 mA power supply. The discharge current is provided to electrodes 12 and 14 through the step-up transformer 48, variable transformer 52, and a discharge current stabilizing circuit which includes choke coil 58 and resistor 60. It should be noted that a known "neon transformer" may be used in place of the discharge current stabilizing circuit. "Neon transformers" are well known and provide a high voltage until the discharge begins, and then the voltage declines according to the needs of the circuit.

An important feature of the excitation source of the instant plasma discharge apparatus is the use of the heated filament electrode and monitoring its temperature. The heated platinum electrode 12 emits thermionic electrons which conform to the Richardson-Dushman's expression:

$$I = AT^2 e^{-w/kT}$$

where, I is the thermionic current density (A/Cm$^2$), w is the work function of the emitter and T is the temperature (°K.) of the emitter. A is a constant equal to $4\pi mek^2/h^3$, where k is Boltzmann's constant, h is Planck's constant, m is the mass of an electron, and e is the charge of an electron. The number of emitted electrons in the plasma depends on the electrode temperature and the work function of the emitter. In this device, the electron density of the plasma can be controlled by changes in the platinum filament temperature and the electrode supply voltage.

The high electron density plasma of the heated electrode of this invention has many advantages: (1) low break-down-voltage; (2) stable high current arc discharge; (3) helium is easily ionized and can readily form a plasma; (4) the helium plasma is able to excite nonmetal elements by the Penning effect.

As illustrated in FIG. 4, the spectral emission from the plasma discharge of the plasma discharge tube 10 is detected by an optical emission spectrometer 61. Such optical emission spectrometers are well known in the art. For example, the following table illustrates detection limits for several elements detectable by the instant invention in a 60 Hz discharge system:

| ELEMENT | DETECTION LIMIT ($\times 10^{-9}$ g/sec.) | STANDARD COMPOUND | DETECTED WAVELENGTH |
|---|---|---|---|
| Oxygen | 65 | H$_2$O | 777.2 nm |
| Hydrogen | 4.9 | H$_2$O | 656.3 nm |
| Carbon | 0.27 | CCl$_2$F$_2$ | 247.5 nm |
| Chlorine | 1.4 | CCl$_2$F$_2$ | 725.7 nm |
| Fluorine | 0.97 | CCl$_2$F$_2$ | 685.6 nm |

Although a specific form of embodiment of the instant invention has been described above and illustrated in the accompanying drawings in order to be more clearly understood, the above description is made by way of example and not as a limitation to the scope of the instant invention. It is contemplated that various modifications apparent to one of ordinary skill in the art could be made without departing from the scope of the invention which is to be determined by the following claims.

What is claimed is:

1. A plasma discharge apparatus, comprising:

a first electrode;

a counter electrode;

a power source for supplying power to said first and counter electrodes for initiating and sustaining a plasma discharge therebetween;

isolated heating means for heating only said first electrode;

isolated temperature sensing means for sensing only the temperature of said first electrode; and a temperature controlling means, responsive to an output of said isolated temperature sensing means, for controlling said isolated heating means to control the temperature of said first electrode, wherein electron emission from the first electrode is controlled by controlling the temperature of the first electrode.

2. The plasma discharge apparatus of claim 1, wherein said first electrode is integrated with said isolated heating means.

3. The plasma discharge apparatus of claim 1, further comprising a plasma chamber containing said first and counter electrodes, said plasma chamber having an inlet port and an exhaust port for allowing a sample gas to pass therethrough.

4. The plasma discharge apparatus of claim 1, wherein said isolated temperature sensing means is a thermocouple.

5. The plasma discharge apparatus of claim 4, wherein said thermocouple is a platinum-platinum/rhodium thermocouple.

6. The plasma discharge apparatus of claim 4, wherein said temperature controlling means includes a primary amplifier connected to said thermocouple.

7. The plasma discharge apparatus of claim 6, wherein said temperature controlling means also includes, a temperature setting circuit receiving an output from said primary amplifier, a power amplifier receiving outputs from said temperature setting circuit and said primary amplifier, and a motor driven by said power amplifier for controlling said isolated heating means.

8. The plasma discharge apparatus of claim 1, wherein said power source includes a step-up transformer for supplying a supply voltage to said first and counter electrodes.

9. The plasma discharge apparatus of claim 1, wherein said isolated heating means includes a step-down transformer.

10. The plasma discharge apparatus of claim 2, wherein said isolated heating means includes a step-down transformer connected directly to said first electrode.

11. The plasma discharge apparatus of claim 1, wherein said isolated electrodes, said power source and said isolated heating means are configured such that helium is usable as a plasma excitation gas.

12. The plasma discharge apparatus of claim 3, wherein said plasma chamber includes a quartz window to allow spectral emissions from the sample plasma to be transmitted therethrough.

13. The plasma discharge apparatus of claim 3, wherein said plasma chamber is configured such that the plasma discharge occurs at substantially atmospheric pressure.

14. The plasma discharge apparatus of claim 3, wherein said exhaust port of said plasma chamber has a size sufficiently small to maintain a flow of gas therefrom which will not allow leakage of atmospheric gas back into said plasma chamber.

15. The plasma discharge apparatus of claim 14, wherein said exhaust port is sufficiently small such that a velocity of gas exiting said exhaust port is maintained substantially at or above 5 meters/second.

* * * * *